(12) United States Patent
Park et al.

(10) Patent No.: US 12,172,617 B2
(45) Date of Patent: Dec. 24, 2024

(54) ELECTRONIC PARKING BRAKE SYSTEM AND CONTROL METHOD THEREOF

(71) Applicant: HL MANDO CORPORATION, Gyeonggi-do (KR)

(72) Inventors: Jaehyun Park, Seoul (KR); Chan Won Lee, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 517 days.

(21) Appl. No.: 17/389,248

(22) Filed: Jul. 29, 2021

(65) Prior Publication Data

US 2022/0032894 A1    Feb. 3, 2022

(30) Foreign Application Priority Data

Jul. 30, 2020    (KR) .................... 10-2020-0094997
Jul. 27, 2021    (KR) .................... 10-2021-0098803

(51) Int. Cl.
*B60T 17/22*    (2006.01)
*B60T 1/06*    (2006.01)
*B60T 13/74*    (2006.01)
*F16D 55/226*    (2006.01)
*F16D 65/18*    (2006.01)
(Continued)

(52) U.S. Cl.
CPC ............ *B60T 17/221* (2013.01); *B60T 1/065* (2013.01); *B60T 13/746* (2013.01); *F16D 55/226* (2013.01); *F16D 65/18* (2013.01); *F16D 66/00* (2013.01); *B60T 2270/406* (2013.01); *F16D 2121/24* (2013.01)

(58) Field of Classification Search
CPC ...... B60T 17/221; B60T 1/065; B60T 13/746; B60T 2270/406; B60T 13/588; B60T 13/662; B60T 17/22; B60T 13/741; F16D 55/226; F16D 65/18; F16D 66/00; F16D 2121/24; F16D 2066/005; F16D 65/183
See application file for complete search history.

(56) References Cited

U.S. PATENT DOCUMENTS 9,511,757  B2 *  12/2016  Baehrle-Miller ..... B60T 13/588
10,870,422 B2 *  12/2020  Jo ........................... B60T 7/085
(Continued)

FOREIGN PATENT DOCUMENTS

KR    10-2018-0042622    4/2018
KR       10-1981479      5/2019

*Primary Examiner* — Kurt Philip Liethen
(74) *Attorney, Agent, or Firm* — Womble Bond Dickinson (US) LLP

(57) ABSTRACT

Disclosed is an electronic parking brake system including an electronic parking brake provided to provide a clamping force necessary for parking a vehicle by a motor, a warning unit provided to warn a failure of the electronic parking brake, a current sensor provided to detect a current of the motor, and a controller electrically connected to the current sensor, wherein the controller determines whether a clamping force is generated depending on the motor current in a parking operation, counts a clamping force non-generation time when the clamping force is not generated, and warns a suspected failure of the electronic parking brake through the warning unit when the clamping force non-generation time elapses a preliminary failure detection time set shorter than a failure detection time of the electronic parking brake.

17 Claims, 7 Drawing Sheets

(51) Int. Cl.
*F16D 66/00* (2006.01)
*F16D 121/24* (2012.01)

(56) References Cited

U.S. PATENT DOCUMENTS

| | | | |
|---|---|---|---|
| 2006/0071548 A1* | 4/2006 | Scheider | G01R 31/007 303/122.04 |
| 2015/0344007 A1* | 12/2015 | Lee | B60T 13/662 701/70 |
| 2015/0369317 A1* | 12/2015 | Choe | F16D 55/225 188/162 |
| 2016/0297410 A1* | 10/2016 | No | B60T 13/741 |
| 2016/0347299 A1* | 12/2016 | No | B60T 13/746 |
| 2017/0028975 A1* | 2/2017 | Suermann | B60T 8/17616 |
| 2018/0099652 A1* | 4/2018 | Jung | B60T 13/662 |
| 2018/0118177 A1* | 5/2018 | No | H02P 7/03 |
| 2018/0126973 A1* | 5/2018 | Choe | F16D 55/226 |
| 2018/0345931 A1* | 12/2018 | Harries | B60T 8/885 |
| 2019/0135259 A1* | 5/2019 | Jo | B60T 7/085 |

* cited by examiner

ELECTRONIC PARKING BRAKE SYSTEM AND CONTROL METHOD THEREOF

CROSS-REFERENCE TO RELATED APPLICATION(S)

This application is based on and claims priority under 35 U.S.C. § 119 to Korean Patent Applications No. 10-2020-0094997, filed on Jul. 30, 2020 and No. 10-2021-0098803 filed on Jul. 27, 2021 in the Korean Intellectual Property Office, the disclosures of which are incorporated by reference herein in its entirety.

BACKGROUND

1. Field

The disclosure relates to an electronic parking brake system having an electronic parking brake operated by a motor and a control method thereof.

2. Description of the Related Art

In general, an electronic parking brake system may generate a clamping force required for parking by a mechanical structure device inside a caliper by increasing a torque generated from a motor through a reducer.

Such an electronic parking brake system determines that the required clamping force is satisfied when a current reaches a predetermined value using a principle that an output torque of the motor is proportional to a current, thereby terminating the control of the motor.

The clamping force may not be generated due to various factors, such as mechanical damages of the reducer of the electronic parking brake and the mechanical structure device. When the current of the motor does not reach the predetermined value during a failure detection time, the electronic parking brake system determines that the electronic parking brake has failed and warns a driver.

However, in a conventional electronic parking brake system, when the driver leaves the vehicle before the failure detection time has elapsed, the clamping force is not generated and a safety accident may occur.

SUMMARY

It is an aspect of the disclosure to provide an electronic parking brake system capable of preventing a driver from leaving a vehicle until a failure determination is completed when a clamping force is not generated, and a control method thereof.

Additional aspects of the disclosure will be set forth in part in the description which follows and, in part, will be obvious from the description, or may be learned by practice of the disclosure.

In accordance with an aspect of the disclosure, an electronic parking brake system includes an electronic parking brake provided to provide a clamping force necessary for parking a vehicle by a motor, a warning unit provided to warn a failure of the electronic parking brake, a current sensor provided to detect a current of the motor, and a controller electrically connected to the current sensor, wherein the controller determines whether a clamping force is generated depending on the motor current in a parking operation, counts a clamping force non-generation time when the clamping force is not generated, and warns a suspected failure of the electronic parking brake through the warning unit when the clamping force non-generation time elapses a preliminary failure detection time set shorter than a failure detection time of the electronic parking brake.

The controller may determine the preliminary failure detection time as a preset time.

The controller may determine the preliminary failure detection time based on a parking release completion determination time for determining a parking release completion in the previous parking release.

The controller may store the parking release completion determination time in the previous parking release in a memory.

The controller may compensate the parking release completion determination time by at least one of a battery voltage and a braking hydraulic pressure in the previous parking release.

The controller may determine the preliminary failure detection time based on a parking release completion determination time for determining a parking release completion in the previous parking release and a battery voltage and a braking hydraulic pressure in the parking operation.

The controller may compensate the preliminary failure detection time so that the preliminary failure detection time increases as the battery voltage decreases.

The controller may compensate the preliminary failure detection time so that the preliminary failure detection time increases as the braking hydraulic pressure increases.

In accordance with an aspect of the disclosure, in a control method of an electronic parking brake provided to provide a clamping force necessary for parking a vehicle by a motor, the control method includes detecting a current of the motor in a parking operation and determining whether a clamping force is generated depending on the detected motor current, counting a clamping force non-generation time when the clamping force is not generated, and warning a suspected failure of the electronic parking brake when the clamping force non-generation time elapses a preliminary failure detection time set shorter than a failure detection time of the electronic parking brake.

The warning of the suspected failure of the electronic parking brake may include determining the preliminary failure detection time as a preset time.

The warning of the suspected failure of the electronic parking brake may include determining the preliminary failure detection time based on a parking release completion determination time for determining a parking release completion in the previous parking release.

The control method may further include storing the parking release completion determination time in the previous parking release in a memory.

The warning of the suspected failure of the electronic parking brake may include determining the preliminary failure detection time based on a parking release completion determination time for determining a parking release completion in the previous parking release and a battery voltage and a braking hydraulic pressure in the parking operation.

The determining of the preliminary failure detection time may include compensating the preliminary failure detection time so that the preliminary failure detection time increases as the battery voltage decreases.

The determining of the preliminary failure detection time may include compensating the preliminary failure detection time so that the preliminary failure detection time increases as the braking hydraulic pressure increases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
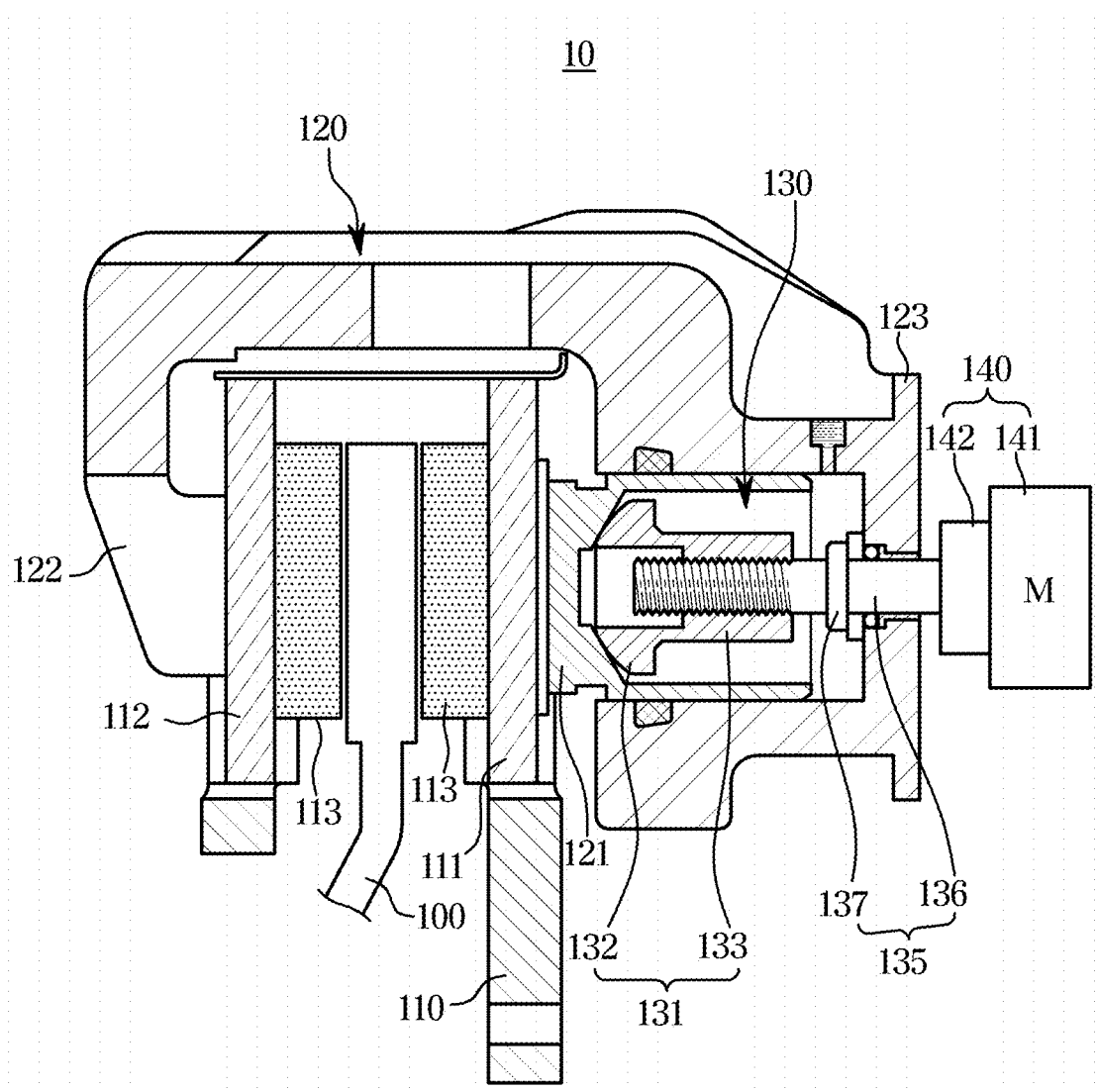
FIG. 1 is a configuration view of an electronic parking brake included in an electronic parking brake system according to an embodiment.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms " " "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 is a configuration view of an electronic parking brake included in an electronic parking brake system according to an embodiment.

Referring to FIG. 1, an electronic parking brake 10 may include a carrier 110 on which a pair of pad plates 111 and 112 are installed to move forward or backward to press a brake disc 100 rotating together with a wheel of a vehicle, a caliper housing 120 provided with a cylinder 123 that is slidably installed on the carrier 110 and in which a piston 121 is installed to move forward or backward by braking hydraulic pressure, a power conversion unit 130 that presses the piston 121, and a motor actuator 140 that transmits a rotational force to the power conversion unit 130 using a motor M.

The pair of pad plates 111 and 112 may be divided into the inner pad plate 111 disposed to contact the piston 121 and the outer pad plate 112 disposed to contact a finger portion 122 of the caliper housing 120. The pair of pad plates 111 and 112 are installed on the carrier 110 fixed to a vehicle body so as to move forward or backward toward both sides of the brake disk 100. In addition, a brake pad 113 may be attached to one surface of each of the pad plates 111 and 112 facing the brake disk 100.

The caliper housing 120 may be slidably installed on the carrier 110. The caliper housing 120 may include the cylinder 123 in which the power conversion unit 130 is installed at a rear portion thereof and the piston 121 is capable of moving forward and backward, and the finger portion 122 formed to be bent in a downward direction to operate the outer pad plate 112 in a front portion thereof. The finger portion 122 and the cylinder 123 may be formed integrally.

The piston 121 may be provided in a cylindrical shape having a cup shape and is inserted into the cylinder 123 so as to be slidable. The piston 121 may press the inner pad plate 111 toward the brake disk 100 by an axial force of the power conversion unit 130 receiving the rotational force of the motor actuator 140. Accordingly, when the axial force of the power conversion unit 130 is applied, the piston 121 advances toward the inner pad plate 111 to press the inner pad plate 111 and the caliper housing 120 operates in a direction opposite to the piston 121 by a reaction force, so that the finger portion 122 presses the outer pad plate 112 toward the brake disk 100 to perform braking.

The power conversion unit 130 may serve to press the piston 121 toward the inner pad plate 111 by receiving rotational force from the motor actuator 140.

The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted, and may be screwed with the spindle member 135.

The nut member 131 may be formed by a head portion 132 provided to come into contact with the piston 121, and a coupling portion 133 formed extending from the head portion 132 and having a female thread formed on an inner circumferential surface thereof to be screwed with the spindle member 135.

The nut member 131 may move in a forward direction or a backward direction according to the rotation direction of the spindle member 135 and may serve to pressurize and release the piston 121. In this case, the forward direction may be a moving direction in which the nut member 131 approaches the piston 121. The reverse direction may be a direction in which the nut member 131 moves away from the piston 121. In addition, the forward direction may be a moving direction in which the piston 121 approaches the brake pad 113. The reverse direction may be a direction in which the piston 121 moves away from the brake pad 113.

The spindle member 135 may include a shaft portion 136 that penetrates the rear portion of the caliper housing 120 and rotates by receiving the rotational force of the motor actuator 140, and a flange portion 137 extending in a radial direction from the shaft portion 136. One side of the shaft portion 136 may be rotatably installed through a rear side of the cylinder 123, and the other side of the shaft portion 136 may be disposed in the piston 121. In this case, one side of the shaft portion 136 passing through the cylinder 123 is connected to the output shaft of a reducer 142 to receive the rotational force of the motor actuator 140.

The motor actuator 140 may include a motor 141 and a reducer 142.

The motor 141 may press or release the piston 121 by moving the nut member 131 forward and backward by rotating the spindle member 135.

The reducer 142 may be provided between the output side of the motor 141 and the spindle member 135.

By having the above configuration, the electronic parking brake 10 may press the piston 121 by moving the nut member 131 by rotating the spindle member 135 in one direction using the motor actuator 140 in a parking operation mode. The piston 121 pressed by the movement of the nut member 131 presses the inner pad plate 111 to bring the brake pad 113 into close contact with the brake disk 100, thereby generating a clamping force.

In addition, the electronic parking brake 10 rotates the spindle member 135 in the opposite direction using the motor actuator 140 in a parking release mode, so that the nut member 131 pressed against the piston 121 may move backward. The pressure on the piston 121 may be released by the retreat movement of the nut member 131. When the pressing on the piston 121 is released, the clamping force generated by the brake pad 113 being separated from the brake disk 100 may be released.

Figure 2:
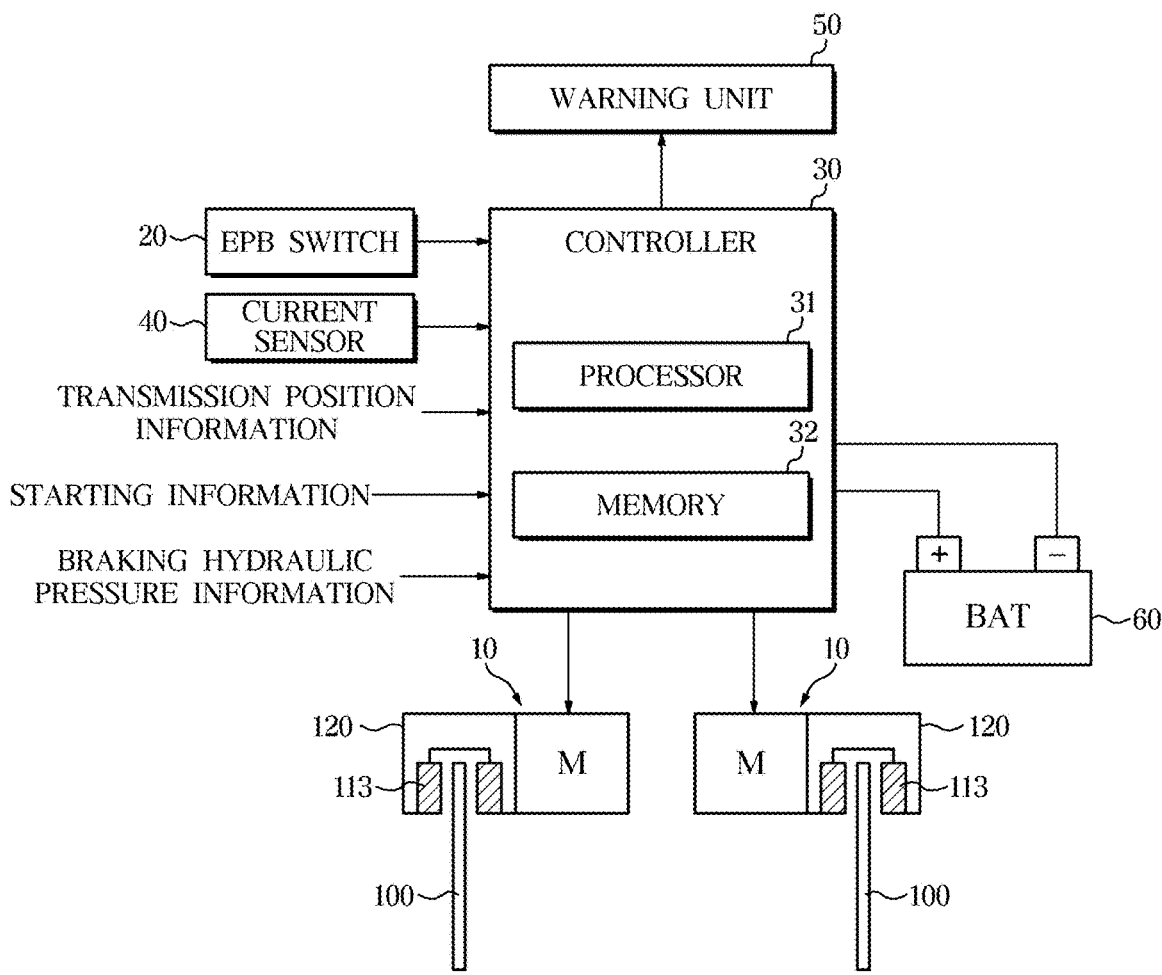
FIG. 2 is a control block diagram of the electronic parking brake system according to an embodiment.

FIG. 2 is a control block diagram of the electronic parking brake system according to an embodiment.

Referring to FIG. 2, the electronic parking brake system may include the electronic parking brake 10, an EPB switch 20, a controller 30, a current sensor 40, and a warning unit 50.

The electronic parking brake 10 may provide the clamping force, which is a fastening force for parking, to a wheel of a vehicle, for example, a brake disk rotating together with left and right rear wheels.

The electronic parking brake 10 generates the clamping force for the respective rear wheels. The electronic parking brake 10 is controlled by an electrically connected controller 30.

The electronic parking brake 10 is operated by the motor 141 to generate the clamping force. The electronic parking brake 10 presses the brake pads 113 in the brake caliper housing 120 to the brake disc 100 on the left and right rear wheels by driving the motor 141, thereby generating the clamping force.

The EPB switch 20, which is a switch for receiving the intention of a driver to operate the electronic parking brake 10, may be provided near a driver seat of the vehicle.

The EPB switch 20 is provided to be turned on or off by the driver.

The EPB switch 20 transmits a signal corresponding to a parking operation command (locking command) to the controller 30 during a turn-on operation and a signal corresponding to a parking release command (locking release command) to the controller 30 during a turn-off operation.

The current sensor 40 may be provided to detect a current flowing in the motor 141 of the electronic parking brake 10. The current sensor 40 may detect a motor current flowing in the motor 141 using a shunt resistor or a Hall sensor. In addition to the shunt resistor or the Hall sensor, the current sensor 40 may use various methods for sensing the motor current.

The warning unit 50 may be formed of a warning light, a cluster, or a combination of the two. The warning unit 50 may give a visual, auditory or audiovisual warning to the driver. The warning unit 50 may be provided as a buzzer or a speaker near a brake pedal of the vehicle, may be provided at a portion inside the vehicle, or may be a speaker of a car audio system provided inside the vehicle. The warning unit 50 may warn the driver of a failure of the electronic parking brake 10 or warn the driver of a suspected failure of the electronic parking brake 10.

The controller 30 may lock or release the electronic parking brake 10 by an operation signal of the EPB switch 20 or an operation signal generated by a program related to the operation of the electronic parking brake 10.

The controller 30 determines whether a current motor current reaches a target current in a parking operation and terminates the parking operation control.

The controller 30 receives power from a battery 60.

The controller 30 may detect an applied voltage supplied from the battery 60.

The controller 30 drives the motor 141 by supplying the power provided from the battery 60 to the motor 141 of the electronic parking brake 10, thereby generating the clamping force. The controller 30 may supply or cut off power to the motors M and 141 when the controller 30 generates or releases the clamping force by driving the motor 141 of each of the electronic parking brakes 10.

The controller 30 may communicate with various systems mounted on the vehicle through a network bus. As the network bus, Ethernet, Media Oriented Systems Transport (MOST), Flexray, Controller Area Network (CAN), Local Interconnect Network (LIN), and the like may be used.

The controller 30 may communicate with various systems mounted on the vehicle to receive various vehicle state information such as transmission position information, starting information, and braking hydraulic pressure information. The transmission position information indicates whether the position of the transmission is a P (parking) position, R (reverse) position, N (neutral) position, or D (driving) position. The starting information indicates whether ignition of the vehicle is in a turn-on state or a turn-off state. The braking hydraulic pressure information indicates the pressure of the cylinder 123 in the electronic parking brake 10. The controller 30 may directly detect the transmission position information, the starting information, and the braking hydraulic pressure information.

The controller 30 may drive the motor 141 of the electronic parking brake 10. The controller 30 may drive the motor 141 in a forward rotation direction or a reverse rotation direction. For example, the controller 30 may include an H-Bridge circuit including a plurality of power switching devices to drive the motor 141 in the forward or reverse rotation direction.

The controller 30 may drive the motor 141 by the operation signal of the EPB switch 20 or the operation signal generated by the program related to the operation of the electronic parking brake 10.

The controller 30 may perform the parking operation mode or the parking release mode according to the operation signal of the EPB switch 20 or the operation signal generated by the program related to the operation of the electronic parking brake 10.

The controller 30 determines whether the electronic parking brake 10 is in a failure state in the parking operation, and warns the driver of the failure of the electronic parking brake 10 through the warning unit 50 when the electronic parking brake 10 is in the failure state.

The controller 30 determines whether the electronic parking brake 10 is in a suspected failure state in the parking operation, and warns the driver of the suspected failure of the electronic parking brake 10 through the warning unit 50 when the electronic parking brake 10 is in the suspected failure state.

The controller 30 may include a processor 31 and a memory 32.

The processor 31 may include a digital signal processor that processes an EPB switch signal, the motor current, a battery voltage, the transmission position information, the starting information, the braking hydraulic information, and the like, and a micro control unit (MCU) that generates a motor driving signal for the parking operation or parking release of the electronic parking brake 10.

The memory 32 may store a program and/or data for the processor 31 to process information such as the EPB switch signal, the motor current, the battery voltage, the transmission position information, the starting information, and the braking hydraulic information, and a program and/or data for the processor 31 to generate the motor driving signal for the parking operation or parking release of the electronic parking brake 10.

The memory 32 may temporarily store information such as the EPB switch signal, the motor current, the battery voltage, the transmission position information, the starting information, and the braking hydraulic information, and may temporarily store the processing result of information, such as the EPB switch signal, the motor current, the battery voltage, the transmission position information, the starting information, and the braking hydraulic information, by the processor 31.

The memory 32 may include a non-volatile memory such as a flash memory, a read only memory (ROM), and an erasable programmable read only memory (EPROM) as well as a volatile memory such as an S-RAM and a D-RAM.

Figure 3:
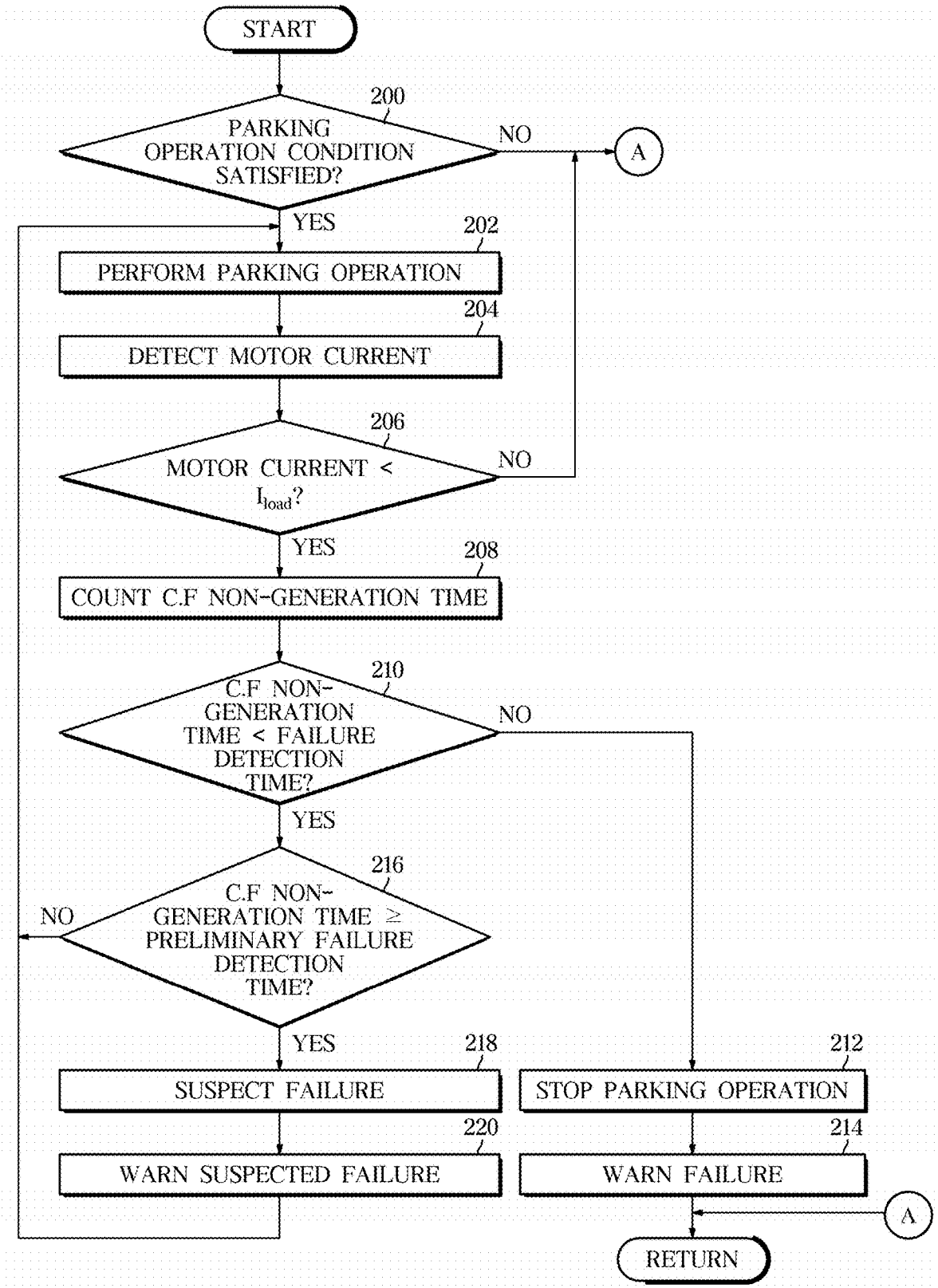
FIG. 3 is a control flowchart of the electronic parking brake system according to an embodiment.

FIG. 3 is a control flowchart of the electronic parking brake system according to an embodiment.

Referring to FIG. 3, first, the controller 30 determines whether a parking operation condition is satisfied (200). The controller 30 may determine that the parking operation condition is satisfied when the EPB switch 20 is in a turn-on state or when the vehicle ignition is turned off in the P-stage of the transmission position.

When the parking operation condition is satisfied, the controller 30 performs the parking operation (202). The controller 30 drives the motor 141 of the electronic parking brake 10 for the parking operation. When the electronic parking brake 10 is in a normal state, not in the failure state, by rotating the motor 141 in a parking operation direction, the spindle member 135 rotates in one direction. The nut member 131 is moved by the rotation of the spindle member 135, and the piston 121 is pressed by the movement of the nut member 131. As the pressed piston 121 presses the inner pad plate 111, the brake pad 113 comes in close contact with the brake disc 100 to generate the damping force.

The controller 30 detects a current of the motor 141 through the current sensor 40 after performing the parking operation of the electronic parking brake 10 (204).

The controller 30 determines whether the motor current is less than a load current (Iload) (206). The load current (Iload) is a motor current value when the damping force starts to be generated. When the motor current is less than the bad current (Iload), the damping force is not generated. When the motor current is not less than the load current (Iload), the clamping force is being generated.

When the motor current is less than the load current (Iload) ('YES' in 206), the controller 30 counts a clamping force non-generation time in which the clamping force is not generated (208).

The controller 30 determines whether the clamping force non-generation time is less than a failure detection time (210). The failure detection time is a preset time for a failure detection of the electronic parking brake 10. While the motor current exceeds the bad current (Iload) and reaches a target current before the failure detection time elapses when the electronic parking brake 10 is in the normal state, the motor current does not reach the load current (Iload) or the target current (current value higher than the load current) until the failure detection time elapses when the electronic parking brake 10 is in the failure state.

When the clamping force non-generation time is not less than the failure detection time ('NO' in 210), the controller 30 stops the motor 141 being driven to stop the parking operation (212), and warns the driver of the failure of the electronic parking brake 10 through the warning unit 50 (214).

On the other hand, when the clamping force non-generation time is less than the failure detection time ('YES' in 210), the controller 30 determines whether the clamping force non-generation time is equal to or greater than a preliminary failure detection time (216). The preliminary failure detection time is set shorter than the failure detection time. The preliminary failure detection time is a time during which the clamping force must be generated when the electronic parking brake 10 is in the normal state.

When the clamping force non-generation time is not longer than the preliminary failure detection time ('NO' in 216), the controller 30 moves to operation mode 202 and performs the following operation modes.

On the other hand, when the clamping force non-generation time is longer than the preliminary failure detection time ('YES' in 216), the controller 30 suspects the failure of the electronic parking brake 10 (218). Because the clamping force has not been generated, but it is still an early time point to determine that the electronic parking brake 10 has failed, the controller 30 suspects the failure of the electronic parking brake 10.

The controller 30 warns the driver of the suspected failure of the electronic parking brake 10 through the warning unit 50 (220). Accordingly, it is possible to prevent the driver from leaving the vehicle until the determination of the failure of the electronic parking brake 10 is completed, so that a safety accident that may occur due to non-generation of the clamping force after the driver leaves the vehicle may be prevented in advance. In addition, the driver may immediately react and brake to an unintended vehicle flow caused due to the non-generation of the clamping force, so that a vehicle stability may be secured and an accident may be prevented.

Figure 4:
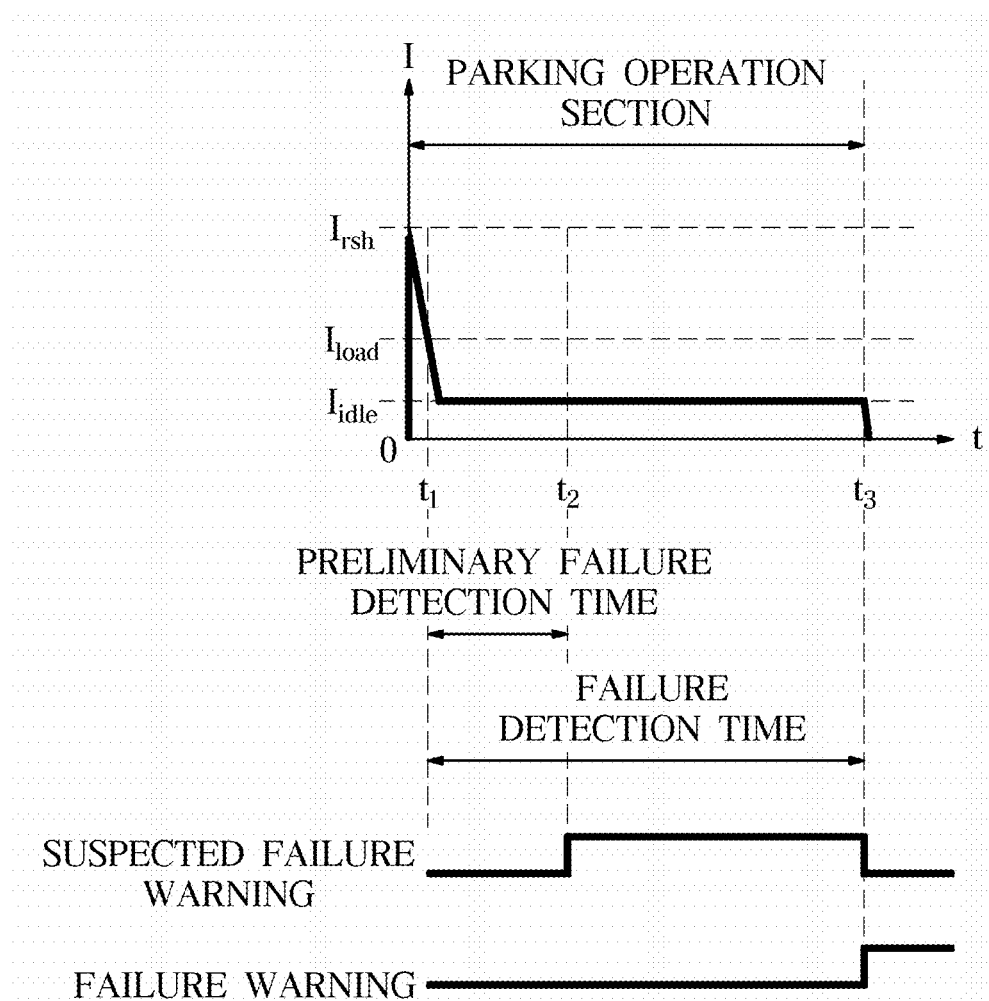
FIG. 4 is a timing diagram illustrating that the electronic parking brake system according to an embodiment suspects a failure of an electronic parking brake and warns depending on a first preliminary failure detection time in a parking operation.

FIG. 4 is a timing diagram illustrating that the electronic parking brake system according to an embodiment suspects a failure of an electronic parking brake and warns depending on a first preliminary failure detection time in the parking operation.

Referring to FIG. 4, the controller 30 drives the motor 141 according to a request for parking operation, detects the motor current generated during the operation of the motor to determine the operation process, and finally determines whether the operation has been completed.

A parking operation section may be largely divided into three parts according to the characteristics of the change in a current value. When a current is initially input to the motor 141, a large amount of current is needed instantaneously because of the inertia to remain stationary. Therefore, there is a part where the current rapidly increases, which is called an in-rush current (Irsh). Thereafter, while the motor 141 rotates, the brake pad 113 is pushed in the direction of the brake disk 100, and this section is referred to as a no-load section because there is no bad other than the weight of the brake pad 113. Finally, a section in which the brake pad 113 is in contact with the brake disc 100 and generates the clamping force while pressing the brake disc 100 up to the target current is referred to as a bad section.

An end point of a parking operation function is a time point at which the load section continues to some extent and a sufficient clamping force is generated to park the vehicle, and because this time point may be determined only by the detected current, a target current value is preset in the electronic parking brake 10.

In FIG. 4, a horizontal axis indicates time, and a vertical axis indicates the motor current.

The failure detection time is from t1 to t3.

The first preliminary failure detection time (t1-t2) is set shorter than the failure detection time. The first preliminary failure detection time (t1-t2) is from t1 to t2 as a preset time.

The load current (Iload) is the motor current value when the clamping force starts to be generated.

A no-load current (Iidle) is a motor current value in the no-load section.

The first preliminary failure detection time (t1-t2) is set longer than the time of the no-load section in the normal state.

Because the motor current is maintained at the no-load current (Iidle) lower than the load current (Iload) during t1 to t2, the clamping force is not generated during the first preliminary failure detection time (t1 to t2). This is a state in which the actual clamping force is not generated in the section where the clamping force starts to be generated due to mechanical damage of the reducer of the electronic parking brake 10 or the mechanical structure device.

In this case, the controller 30 suspects the failure of the electronic parking brake 10 and warns of the suspected failure. This warning of suspected failure may prevent the driver from leaving the vehicle until the failure determination is completed.

Figure 5:
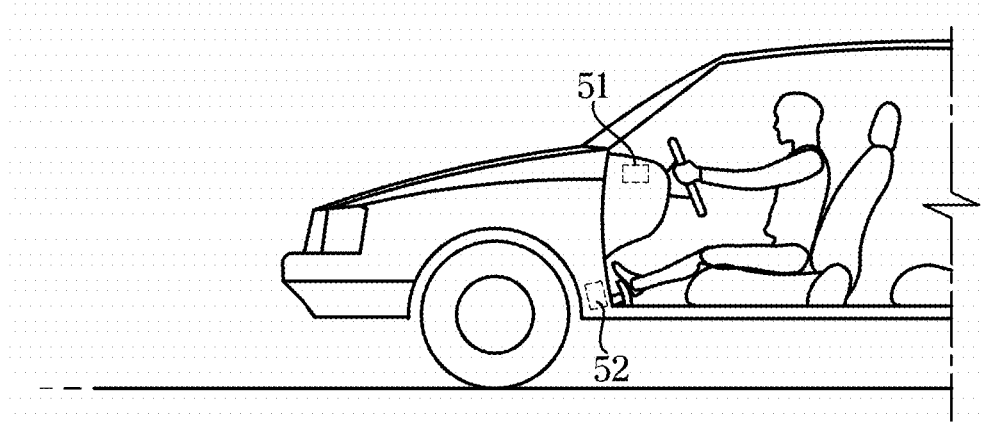
FIG. 5 is a view illustrating that the electronic parking brake system according to an embodiment warns of a suspected failure of the electronic parking brake in the parking operation.

FIG. 5 is a view illustrating that the electronic parking brake system according to an embodiment warns of a suspected failure of the electronic parking brake in the parking operation.

The controller 30 warns the driver through the warning unit 50 that the electronic parking brake 10 is in a suspected failure state.

The controller 30 visually and/or audibly warns the driver that the electronic parking brake 10 is in a suspected failure state through the combination of a warning light 51 and a speaker 52 of the warning unit 50, thereby preventing the driver from leaving the vehicle until the failure determination is completed.

Referring again to FIG. 4, when the clamping force is not generated during the failure detection time (t1 to t3) after the warning of the suspected failure, the controller 30 confirms the failure and warns the failure of the electronic parking brake 10.

The preliminary failure detection time is not preset like the first preliminary failure detection time, and may be determined based on the time for determining the completion of parking release in the previous parking release. The parking release completion determination time may be set based on a no-load duration.

Figure 6:
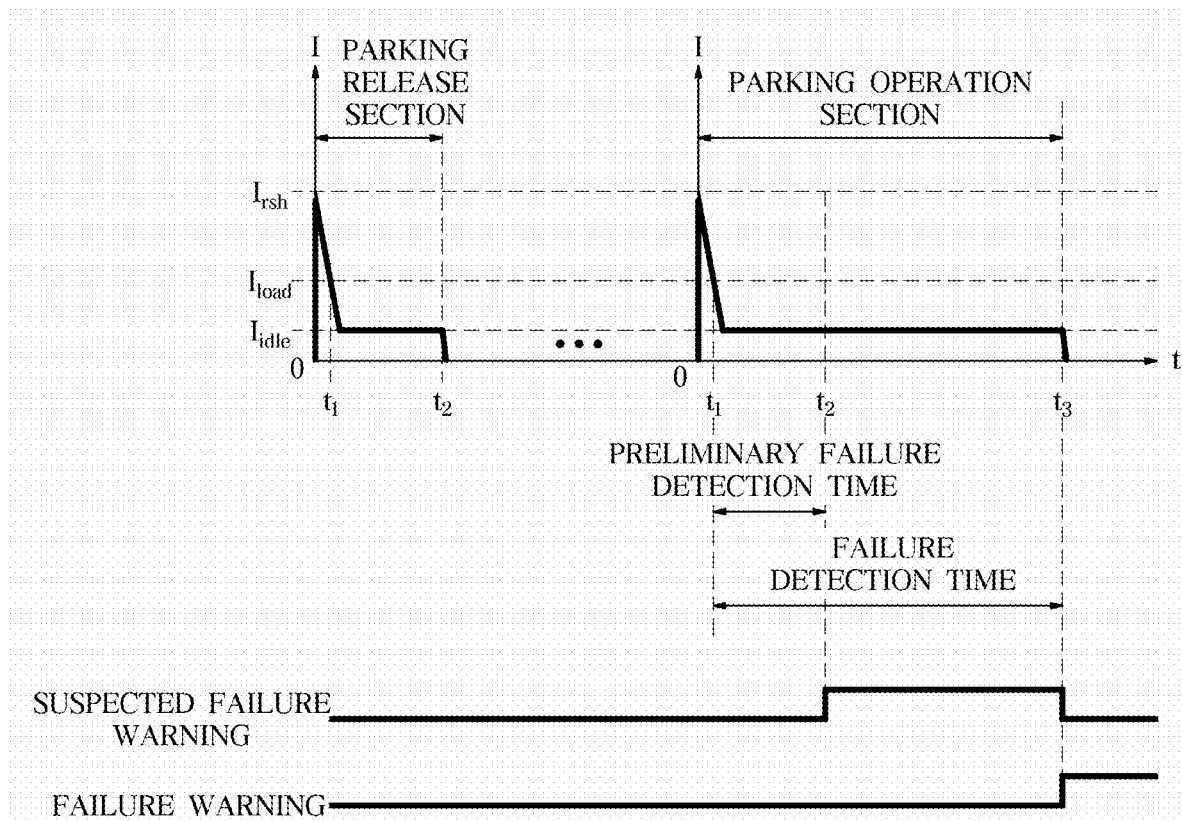
FIG. 6 is a timing diagram illustrating that the electronic parking brake system according to an embodiment suspects a failure of the electronic parking brake and warns depending on a second preliminary failure detection time in the parking operation.

FIG. 6 is a timing diagram illustrating that the electronic parking brake system according to an embodiment suspects a failure of the electronic parking brake and warns depending on a second preliminary failure detection time in the parking operation.

Referring to FIG. 6, a second preliminary failure detection time (t1-t2) may be a parking release completion determination time in the parking release. The parking release completion determination time (t1-t2) when the parking release is completed in the previous parking release is stored in the memory 32. In this case, the parking release completion determination time may be compensated depending on the battery voltage and/or the brake hydraulic pressure. For example, because the motor 141 rotates more slowly and the no-load time increases as the battery voltage decreases, the parking release completion determination time may be compensated to increase as the battery voltage decreases. In addition, because a moving distance of the nut member 131 in the no-load section increases as the braking hydraulic pressure, which is the pressure in the cylinder 123 of the electronic parking brake 10, increases, the parking release completion determination time (t1-t2) may be compensated to increase.

In this state, the controller 30 sets the second preliminary failure detection time (t1-t2) to the parking release completion determination time (t1-t2) stored in the memory 32 in the parking operation, and suspects the failure of the electronic parking brake 10 based on the second preliminary failure detection time (t1-t2).

The second preliminary failure detection time (t1-t2) may be set based on a time point at which the motor current is decreased to be lower than the load current (Iload) or a time point at which the motor current is decreased to the no-load current (Iidle).

Because the motor current is maintained at the no-load current (Iidle) lower than the load current (Iload) during t1 to t2, the clamping force is not generated during the second preliminary failure detection time (t1 to t2).

In this case, the controller 30 suspects the failure of the electronic parking brake 10 and warns of the suspected failure. This warning of suspected failure may prevent the driver from leaving the vehicle until the failure determination is completed.

When the clamping force is not generated during the failure detection time (t1 to t3) after the warning of the suspected failure, the controller 30 confirms the failure and warns the failure of the electronic parking brake 10.

Figure 7:
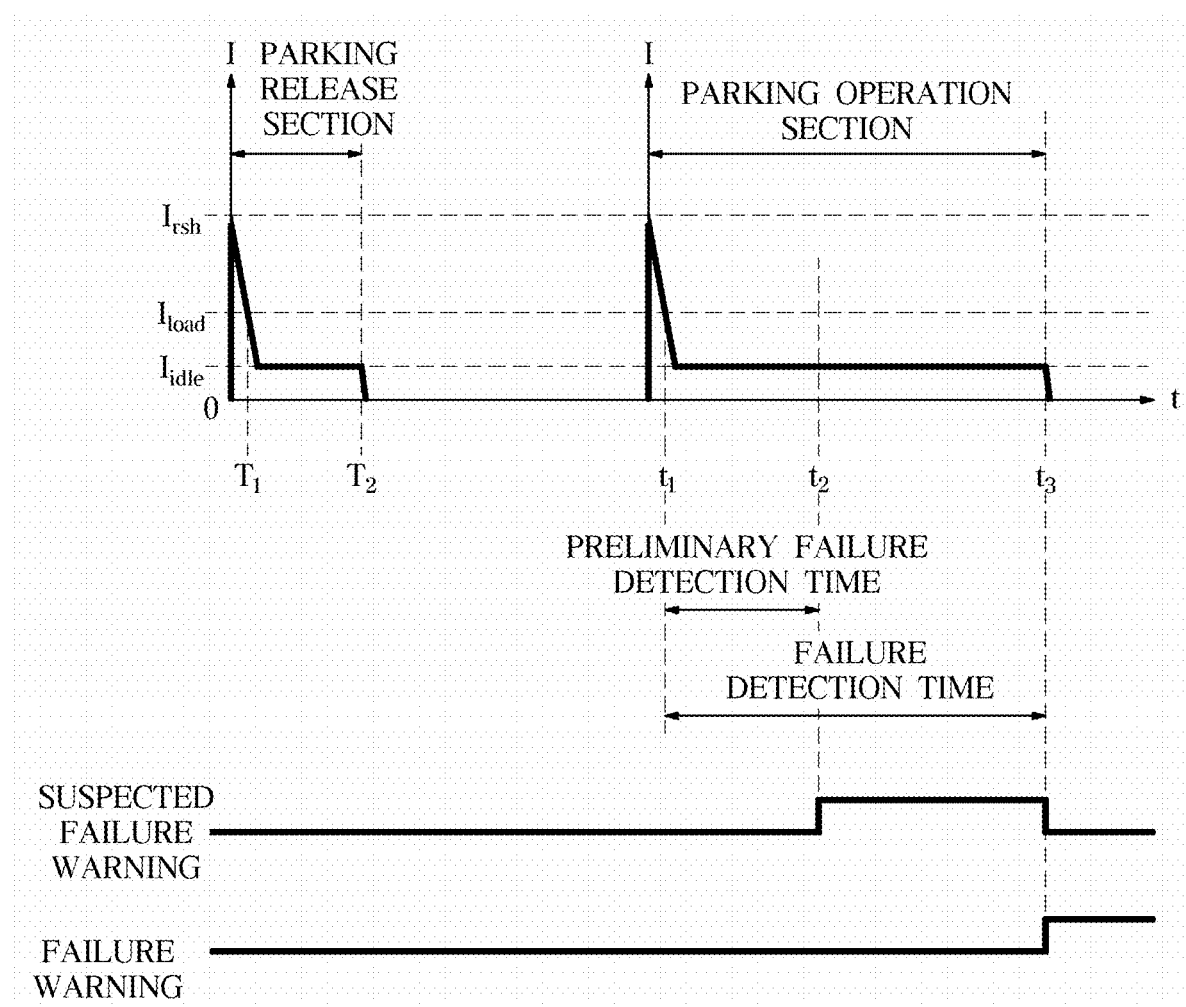
FIG. 7 is a timing diagram illustrating that the electronic parking brake system according to an embodiment suspects a failure of the electronic parking brake and warns depending on a third preliminary failure detection time in the parking operation.

FIG. 7 is a timing diagram illustrating that the electronic parking brake system according to an embodiment suspects a failure of the electronic parking brake and warns depending on a third preliminary failure detection time in the parking operation.

Referring to FIG. 7, a third preliminary failure detection time (t1-t2) is determined based on a parking release completion determination time (T1-T2) in the parking release, and the battery voltage and the braking hydraulic pressure in parking operation.

The third preliminary failure detection time (t1-t2) is set to the parking release completion determination time (T1-T2) as a basic time, and is compensated depending on the battery voltage and braking hydraulic pressure in the parking operation.

Because the motor 141 rotates more slowly as the battery voltage decreases, the no-load time increases. Therefore, the third preliminary failure detection time is compensated to increase as the battery voltage decreases.

Because the a moving distance of the nut member 131 in the no-load section increases as the braking hydraulic pressure, which is the pressure in the cylinder 123 of the electronic parking brake 10 increases, the third preliminary failure detection time is compensated to increase.

The third preliminary failure detection time (t1-t2) may be set based on a time point at which the motor current is decreased to be lower than the load current (Iload) or a time point at which the motor current is decreased to the no-load current (Iidle).

Because the motor current is maintained at the no-load current (Iidle) lower than the load current (Hoed) during t1 to t2, the clamping force is not generated during the third preliminary failure detection time (t1 to t2).

In this case, the controller 30 suspects the failure of the electronic parking brake 10 and warns of the suspected failure. This warning of suspected failure may prevent the driver from leaving the vehicle until the failure determination is completed.

When the clamping force is not generated during the failure detection time (t1 to t3) after the warning of the suspected failure, the controller 30 confirms the failure and warns the failure of the electronic parking brake 10.

Although the above embodiments has been described in relation on a motor-on-caliper type electronic parking brake, the disclosure is not limited thereto, and the disclosure may be applied to an electric drum brake in which a drum rotating together with a wheel is provided and a braking is performed by an expansion of a pair of brake shoes, on which brake linings are attached.

In addition, although the above embodiments have been described with respect to an electronic parking brake system having a motor-on-caliper type electronic parking brake or having an electric drum brake, the disclosure is not limited thereto. The electronic parking brake system may include an electro mechanical brake system that performs not only a service brake function for providing a braking force in a driving situation of a vehicle but also a parking brake function for maintaining the vehicle in a stop state when parking.

As is apparent from the above, an electronic parking brake system and a control method thereof according to the disclosure can prevent a driver from leaving a vehicle until a failure determination is completed when a clamping force is not generated, so that a safety accident that may occur due to non-generation of the clamping force after the driver leaves the vehicle can be prevented in advance.

Further, the electronic parking brake system and the control method thereof according to the disclosure enables the driver to immediately react and brake to an unintended vehicle flow caused due to the non-generation of the clamping force, thereby securing a vehicle stability and preventing an accident.

What is claimed is:

1. An electronic parking brake system comprising:
   an electronic parking brake provided to provide a clamping force necessary for parking a vehicle by a motor;
   a warning unit provided to warn a failure of the electronic parking brake;
   a current sensor provided to detect a current of the motor; and
   a controller electrically connected to the current sensor,
   wherein the controller determines whether a clamping force is generated depending on the motor current in a parking operation, counts a clamping force non-generation time when the clamping force is not generated, and warns a suspected failure of the electronic parking brake through the warning unit when the counted clamping force non-generation time elapses exceeds a preliminary failure detection time set shorter than a full failure detection time of the electronic parking brake.

2. The electronic parking brake system according to claim 1, wherein
   the controller determines the preliminary failure detection time as a preset time.

3. The electronic parking brake system according to claim 1, wherein
   the controller determines the preliminary failure detection time based on a parking release completion determination time for determining a parking release completion in a previous parking release.

4. The electronic parking brake system according to claim 3, wherein
   the controller stores the parking release completion determination time in the previous parking release in a memory.

5. The electronic parking brake system according to claim 4, wherein
   the controller compensates the parking release completion determination time based on at least one of a battery voltage and a braking hydraulic pressure in the previous parking release.

6. The electronic parking brake system according to claim 1, wherein
   the controller determines the preliminary failure detection time based on a parking release completion determination time, which is for determining a parking release completion in the previous parking release, and a battery voltage and a braking hydraulic pressure, which are in during the parking operation.

7. The electronic parking brake system according to claim 6, wherein
   the controller compensates the preliminary failure detection time so that the preliminary failure detection time increases as the battery voltage decreases.

8. The electronic parking brake system according to claim 6, wherein
   the controller compensates the preliminary failure detection time so that the preliminary failure detection time increases as the braking hydraulic pressure increases.

9. A control method of an electronic parking brake provided to provide a clamping force necessary for parking a vehicle by a motor, the control method comprising:
   detecting a current of the motor in a parking operation and determining whether a clamping force is generated depending on the detected motor current;
   counting a clamping force non-generation time when the clamping force is not generated; and
   warning a suspected failure of the electronic parking brake when the counted clamping force non-generation time exceeds a preliminary failure detection time set shorter than a full failure detection time of the electronic parking brake.

10. The control method according to claim 9, wherein the warning of the suspected failure of the electronic parking brake comprises determining the preliminary failure detection time as a preset time.

11. The control method according to claim 9, wherein the warning of the suspected failure of the electronic parking brake comprises determining the preliminary failure detection time based on a parking release completion determination time for determining a parking release completion in a previous parking release.

12. The control method according to claim 11, further comprising
storing the parking release completion determination time in the previous parking release in a memory.

13. The control method according to claim 9, wherein the warning of the suspected failure of the electronic parking brake comprises determining the preliminary failure detection time based on a parking release completion determination time, which is for determining a parking release completion in the previous parking release, and a battery voltage and a braking hydraulic pressure, which are in during the parking operation.

14. The control method according to claim 13, wherein the determining of the preliminary failure detection time comprises compensating the preliminary failure detection time so that the preliminary failure detection time increases as the battery voltage decreases.

15. The control method according to claim 13, wherein the determining of the preliminary failure detection time comprises compensating the preliminary failure detection time so that the preliminary failure detection time increases as the braking hydraulic pressure increases.

16. The electronic parking brake system according to claim 1, wherein the controller is configured to:
when the counted clamping force non-generation time is greater than the preliminary failure detection and less than the full failure detection time of the electronic parking brake, perform the parking operation and warn the suspected failure of the electronic parking brake, and
when the counted clamping force non-generation time is greater than the full failure detection time set longer than the preliminary failure detection time of the electronic parking brake, stop the parking operation and warn a failure of the electronic parking brake.

17. The control method according to claim 9, further comprising:
when the counted clamping force non-generation time is greater than the preliminary failure detection and less than the full failure detection time of the electronic parking brake, performing the parking operation and warning the suspected failure of the electronic parking brake, and
when the counted clamping force non-generation time is greater than the full failure detection time set longer than the preliminary failure detection time of the electronic parking brake, stopping the parking operation and warning a failure of the electronic parking brake.

* * * * *